June 2, 1959 J. W. GRATIAN ET AL 2,889,414

COMBINATION RECORDING HEADS

Filed Jan. 11, 1954

INVENTORS.
JOSEPH W. GRATIAN
WILLIAM B. LATCHFORD
BY
T. L. Bowes
ATTORNEY

United States Patent Office 2,889,414

Patented June 2, 1959

2,889,414

COMBINATION RECORDING HEADS

Joseph W. Gratian and William B. Latchford, Rochester, N.Y., assignors, by mesne assignments, to General Dynamics Corporation, a corporation of Delaware Application January 11, 1954, Serial No. 403,127

9 Claims. (Cl. 179—100.2)

Figure 1:
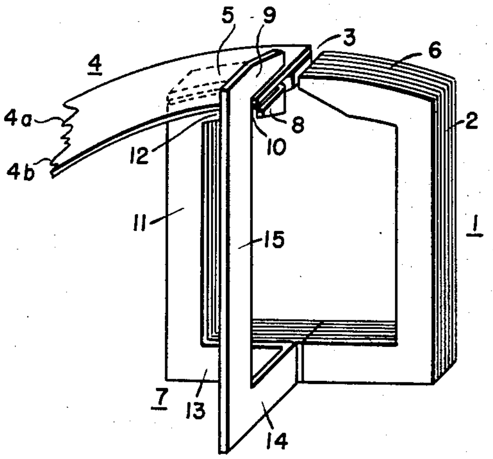

This invention relates to magnetic recording apparatus and in particular to combination recording heads for use in magnetic recording apparatus.

Magnetic recording systems have heretofore employed several different methods of recording intelligence on a magnetic medium. The most commonly used method is known as longitudinal recording in which the magnetic medium is moved through a field established at a gap across a surface of the recording head in such a way that the medium moves in a direction parallel to the lines of force constituting the field through which the medium passes, but transverse recording (in which the lines of force constituting the field through which the medium passes lie at right angles to the direction of movement of the medium and generally in the same plane as the medium) and perpendicular recording (in which the lines of force constituting the magnetic field are generally perpendicular to the plane of the medium) have also been utilized.

Perpendicular recording is advantageous in the low frequency response range but is characterised by a relatively poor high frequency response characteristic because the recording and reproducing or playback gaps are necessarily longer than those which can be provided in ring type heads commonly used for longitudinal recording. Conversely, longitudinal recording is of greatest utility in the high frequency response region but is relatively deficient in the low frequency band.

It is an object of our invention to provide a new and improved recording head for use in magnetic recording apparatus.

It is another object of our invention to provide a new and improved magnetic recording head which utilizes a plurality of recording methods.

Still another object of our invention is to provide a new and improved magnetic recording head which provides an improved frequency response.

Still another object of our invention is to provide a new and improved magnetic recording head having a plurality of sections, which provide, respectively, different forms of magnetic recording.

In carrying out our invention we have provided a magnetic recording head comprising two sections. The first section is designed to effect longitudinal recording on a portion of a magnetic record or medium which is preferably a tape having substantial width. The second section is designed to be electrically or magnetically coupled to the first section whereby signals reproduced on playback provide an extended frequency response range. In the preferred embodiment, the second section is positioned physically close to the first section but is provided with spaced apart poles disposed at right angles to the poles defining the gap in the first or longitudinal section in such a manner that perpendicular recording is effected on another portion of the magnetic medium. The pole portions of the perpendicular recording section are preferably so positioned that the magnetic medium may contact the surface of the first or longitudinal section while being centered in the second or perpendicular section. Suitable means are provided for energizing the two sections with bias and audio currents. One or more coils or sources of signal may be employed as conditions require and one or more coils may encircle the cores or portions of the cores defining the two sections.

Figure 2:
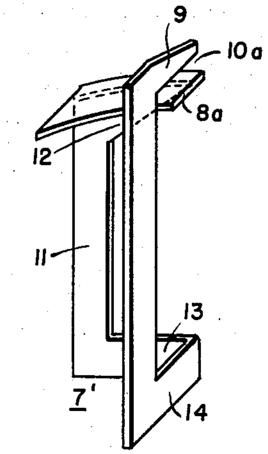
Figure 3:
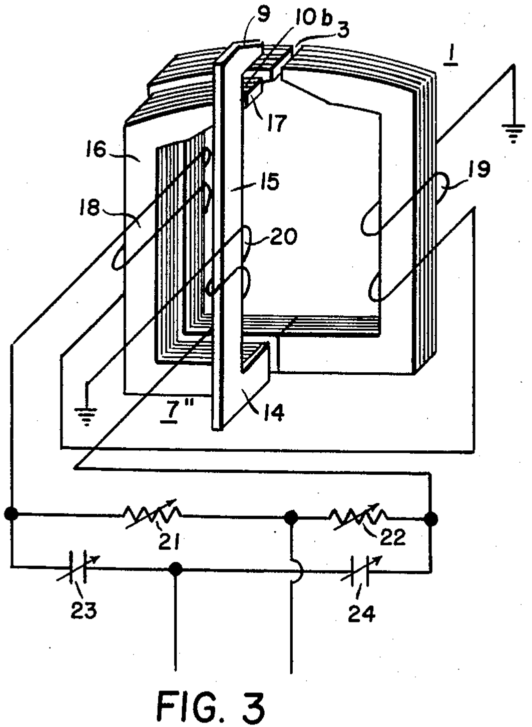

The features of our invention which we believe to be novel are set forth with particularity in the appended claims. Our invention itself, both as to its organization and manner of operation, together with further objects and advantages thereof, may best be understood by reference to the following description taken in connection with the accompanying drawing in which:

Fig. 1 illustrates one embodiment of our invention,

Fig. 2 discloses a modification of a portion of the combination head shown in Fig. 1, and Fig. 3 shows a second modification of the structure of Fig. 1 together with electrical circuit connections.

Referring to Fig. 1, there is illustrated a combination magnetic recording head having a first recording section 1 comprising a ring type core 2, preferably laminated, and having an air gap 3 across the upper curved face of section 1. It will be understood that section 1 is so arranged that one portion of a suitable magnetic medium (illustrated in Fig. 1 as being a tape 4) may be drawn, by means not shown, first across pole portion 5, then across gap 3, and then across pole portion 6 of core 2 comprising longitudinal or first section 1. Thus there is provided a first recorded track on medium 4 which is substantially entirely longitudinally recorded.

Means is provided for perpendicularly recording on portion 4*b* of tape 4. This means includes a second or perpendicular recording section 7 which includes, as viewed in Fig. 1, vertically spaced apart co-planar pole portions 8 and 9 defining a gap 10 whereby portion 4*b* of medium 4 may be drawn through gap 10 intermediate poles 8 and 9. In the form of our invention illustrated in Fig. 1, section 7 comprises a single strip or lamination of suitable magnetic material having a portion 11 parallel to and closely adjacent one leg of core 2, a laterally extending portion 12 parallel to and closely adjacent pole portion 5 of core 2, and pole portion 8 which may be formed by bending portion 12 to a position substantially at right angles to portion 12. The lower end of section 7 as viewed in Fig. 1 is provided with a portion 13 parallel to and closely adjacent the bottom leg of core 2, a lateral portion 14, which may be formed by bending portion 13 to a position at right angles to portion 13, a portion 15 substantially parallel to portion 11 and lying in a plane normal to the plane of portion 11, and pole portion 9 which, of course, is perpendicular to portion 15 and is co-planar with portion 8 as well as sufficiently spaced apart from portion 8 to provide the previously identified gap 10. Pole portions 8 and 9 may be suitably tapered for flux concentration purposes and the spacing between the pole pieces 8 and 9 is chosen to provide the desired field in gap 10.

The trailing edges of pole portions 8 and 9 are preferably aligned with gap 3 and the upper and lower pole pieces are preferably equal distances above and below the surface of core 2 so that the magnetic coating on the lower side of medium 4 can contact the gap carrying surface of core 2 while being centered in gap 10.

If desired, the lower pole piece 8 can be coated or otherwise provided with a suitable non-magnetic material to a depth equal to half the length of gap 10 to provide a positioning surface for portion 4*b* of medium 4 within gap 8.

Fig. 2 illustrates a modified arrangement for the perpendicular recording section 7 of Fig. 1. Alternate perpendicular section 7′ of Fig. 2 has portions 11, 12, 13, 14, and 15 as well as pole portion 9 corresponding to those shown in Fig. 1. However, pole portion 8 of Fig. 1 has been replaced by a generally rectangular curved pole portion 8*a* which defines, in cooperation with pole piece 9, a perpendicular recording gap 10*a*.

Fig. 3 shows a second modification in which section 1 is identical to section 1 of Fig. 1. The perpendicular recording section 7″ of Fig. 3, however, comprises a laminated portion 16 which is a substantial duplicate of the left-hand portion of section 1 and lies parallel and adjacent to that portion of section 1. Second section 7″ is also provided with a single lamination having portions 14 and 15 and pole portion 9 substantially identical to the corresponding portions of Fig. 1, the free end of portion 14 being suitably secured to the lower end of portion 16 as by welding or by extending and suitably bending or otherwise forming one of the laminations of portion 16, for example. Pole portions 17 and 9 define a gap 10*b* through which a suitable medium may be drawn.

It will thus be seen that in each of the three embodiments illustrated herein, arrangements are made for longitudinally recording on a portion of a medium and for perpendicularly recording on another portion of a medium.

It will be noted that in each of the versions disclosed herein portions of the two sections lie closely adjacent each other. By reason of this proximity, portions of both sections may be encircled by a single bias-audio coil such as winding 18 in Fig. 3, thereby minimizing space requirements and reducing the number of separate parts as well as the cost of manufacture. Additional coils 19 and 20 encircling different portions of sections 1 and 7″ respectively, are illustrated for the purpose of inducing additional audio and bias flux into sections 1 and 7″, if desired. In the network shown in Fig. 3, audio is introduced between resistors 21 and 22 and bias is introduced between capacitors 23 and 24. The audio currents in the longitudinal and perpendicular fields are controlled substantially entirely by suitable variable resistors 21 and 22, respectively, and the bias currents are respectively controlled by suitable variable capacitors 23 and 24.

While we have shown and described a particular embodiment of our invention, it will be obvious to those skilled in the art that changes and modifications may be made without departing from our invention in its broader aspects. We, therefore, aim in the appended claims to cover all such changes and modifications as fall within the true spirit and scope of our invention.

What we claim is:

1. A magnetic recording head having a first recording section comprising a ring-type core arranged for longitudinal recording, and a second recording section arranged for perpendicular recording, said first and second recording sections being positioned relative to each other so as to record on different portions of a magnetic recording medium being transported past said head, and means common to both said first and second recording sections for applying the same energizing signals to each of said sections.

2. A magnetic recording head comprising a first recording section having a core of magnetic material and a gap across a surface thereof, said gap being disposed to effect when energized longitudinal recording on a portion of a magnetic medium when drawn thereacross, and a second recording section having a core portion closely adjacent at least a portion of the core of said first section and having vertically spaced apart pole portions extending at right angles to the plane of said first section in alignment with said gap, said pole portions defining a second gap disposed to effect when energized perpendicular recording on another portion of said medium.

3. The recording head of claim 2 in which the recording sections are coupled together whereby signals reproduced therefrom provide an extended frequency response range.

4. The recording head of claim 2 in which the pole portions are also disposed equal distances above and below said surface of said first section whereby said medium may contact said surface of said first section while being centered in the second gap.

5. The recording head of claim 4 in which the pole portions are also co-planar extensions of the core portion of said second section.

6. The recording head of claim 2 in which portions of said first and second sections are encircled by an energizing winding.

7. The recording head of claim 2, in which portions of both sections are encircled by a first energizing winding and each section is also separately encircled by an auxiliary energizing winding.

8. The recording head of claim 2 in which the core and pole portions of the second section comprise a single lamination.

9. The recording head of claim 2 in which the core portion of said second section comprises a plurality of laminations and the pole portion of said second section comprises a single lamination.

References Cited in the file of this patent

UNITED STATES PATENTS

| | | |
|---|---|---|
| 2,272,821 | Roys | Feb. 10, 1942 |
| 2,423,339 | Newman | July 1, 1947 |
| 2,488,717 | Eilenberger | Nov. 22, 1949 |
| 2,628,285 | Camras | Feb. 10, 1953 |
| 2,660,622 | Field | Nov. 24, 1953 |
| 2,675,429 | Rohling | Apr. 13, 1954 |

OTHER REFERENCES

Magnetic Recording, S.S. Begun, 1949, pages 50–53.